United States Patent
Neumann et al.

(10) Patent No.: US 8,033,596 B2
(45) Date of Patent: Oct. 11, 2011

(54) BODY STRUCTURE

(75) Inventors: Wolfgang Neumann, Eberdingen (DE); Holger Hahlweg, Calw (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 71 days.

(21) Appl. No.: 12/609,533

(22) Filed: Oct. 30, 2009

(65) Prior Publication Data

US 2010/0148538 A1 Jun. 17, 2010

(30) Foreign Application Priority Data

Dec. 12, 2008 (DE) .......... 10 2008 062 003

(51) Int. Cl.
*B60J 7/00* (2006.01)
(52) U.S. Cl. .......... 296/193.08; 296/193.05; 296/203.03
(58) Field of Classification Search ............ 296/187.11, 296/193.08, 187.12, 193.05, 29, 203.03, 296/198
See application file for complete search history.

(56) References Cited

U.S. PATENT DOCUMENTS

| 4,618,163 | A | * | 10/1986 | Hasler et al. ............. | 280/785 |
| 5,660,428 | A | | 8/1997 | Catlin | |
| 6,193,273 | B1 | | 2/2001 | Novak et al. | |

FOREIGN PATENT DOCUMENTS

| DE | 10218701 C1 | 6/2003 |
| DE | 10 2006 014 979 A1 | 10/2007 |
| DE | 102006014402 A1 | 10/2007 |
| FR | 2836885 A1 | 9/2003 |

OTHER PUBLICATIONS

German Search Report dated Jan. 11, 2010.

* cited by examiner

*Primary Examiner* — Joseph Pape

(57) ABSTRACT

A body structure of a motor vehicle has a rear side wall which is constructed in a simple manner. It is important for the side wall to have at least the following components configured as light metal diecast parts: a support, a suspension strut mount and a bracket for a rollover protection device.

5 Claims, 2 Drawing Sheets

BODY STRUCTURE

CROSS-REFERENCE TO RELATED APPLICATION

This application claims the priority, under 35 U.S.C. §119, of German application DE 10 2008 062 003.3, filed Dec. 12, 2008; the prior application is herewith incorporated by reference in its entirety.

BACKGROUND OF THE INVENTION

Field of the Invention

The present invention relates to a body structure of a motor vehicle with a rear side wall.

A body structure of the type in question is known, for example, from U.S. Pat. No. 6,193,273 B1 in which the body structure shown there is predominantly composed of individual struts which are connected to one another in junction regions via corresponding junction elements.

Published, non-prosecuted German patent application DE 10 2006 014 979 A1 discloses a further body structure for a motor vehicle, which has a cast longitudinal member element which is configured at least in some sections as an open profile and which has a first connecting section for the fastening of a longitudinal member and a second connecting section for the fastening of a sill of the body structure, one at each end. In order to be able to construct the body structure in an overall simpler manner, the second connecting section is configured as an extension of the open profile and, together with a closing element, forms a transverse supporting section which is oriented transversely with respect to the longitudinal extent of the longitudinal member element. Furthermore, both the sill and a crossmember running in a direction away from the sill are fastened to the transverse supporting section.

SUMMARY OF THE INVENTION

It is accordingly an object of the invention to provide a body structure which overcomes the above-mentioned disadvantages of the prior art devices of this general type, which is an improved embodiment or at least a different embodiment which is constructed in a simple manner and has a high degree of rigidity.

The present invention is based on the general concept of composing a rear side wall of a body structure from a plurality of components each configured as a light metal diecast part and of thereby obtaining a simply constructed side wall which has a high degree of rigidity owing to the individual light metal diecast parts used. In this case, the side wall is composed of at least the following components: a support, a suspension strut mount and a bracket for a rollover protection device. All of these individual components are configured as light metal diecast parts and, as a result, can be produced cost-effectively and with a high degree of dimensional accuracy and also have only a low weight, which is of great advantage in motor vehicle manufacturing and in particular in sports vehicle manufacturing.

In an advantageous development of the solution according to the invention, at least one of the components of the side wall is formed from diecast aluminum or magnesium. Diecast aluminum is understood as meaning a diecasting process in which aluminum is pressed in a liquid or pasty state under high pressure into a preheated steel mold. In the process, it displaces the air present in the mold and is kept under pressure during the solidification process. The pure light metal aluminum very rapidly forms a thin oxide layer in the air, giving it a dull and silver-grey appearance and making the aluminum extremely corrosion-resistant. In general, this oxide layer also protects the aluminum located therebeneath from further oxidation. Since pure aluminum is unsuitable for many use purposes because of its deficient strength properties, further alloying elements, such as, for example, iron, copper or silicon, are mixed with the aluminum during the production process and, as a result, a substantial improvement in the casting and strength properties is achieved. In general, instead of diecast aluminum, diecast magnesium can also be used, which leads to advantages in particular in the actual diecasting process. In comparison to aluminum, magnesium is also approximately a third lighter, like aluminum is covered with an oxide layer in air, but, in contrast to aluminum, is not opaque. In general, both aluminum and magnesium have the great advantage of being corrosion-resistant and furthermore having a comparatively low weight, which, in particular in motor vehicle manufacturing, leads to saving on fuel and therefore to not inconsiderable advantages.

In an advantageous development of the solution according to the invention, stiffening contours, in particular "reinforcing ribs", are provided on the support of the side wall. The stiffening contours preferably form an integral part of the support and are arranged precisely at the points at which increased loads can be expected. The position, positioning and the strength of the individual stiffening contours may be calculated, for example, in advance by use of "finite-element programs", in which the actual stiffening contours are predetermined by an appropriate configuration of the diecasting mold such that the contours can be produced in one working step together with the support during the diecasting operation. By the position, orientation and strength of the individual stiffening contours being defined in advance by a calculation, it is always ensured that the stiffening contours are only arranged where they are absolutely necessary in order to absorb higher loads, whereas they can be saved at other points, which in turn leads to weight advantages. Of course, the reinforcing contours can have a very wide variety of forms, and therefore the reinforcing ribs mentioned previously constitute just one possible embodiment of such stiffening contours.

In a further advantageous embodiment of the solution according to the invention, the support, the suspension strut mount and the bracket are connected fixedly to one another via a welded joint and/or via a self-piercing riveted joint. In this case, the welding used is in particular the "metal-inert-gas welding process" (MIG) in which, with the aid of an inert gas, air is prevented from passing to the actual welding point. MIG welding is one of the more recent arc welding processes. In general, "inert gas", in this case argon, but also helium, can be supplied, the inert gases mentioned expressly not being active gases. As an alternative or in addition, the individual components of the side wall can also be connected non-releasably to one another by a self-piercing riveting process in which use is made of a rivet element (auxiliary joining part) which acts at the same time as a ram such that the pre-drilling necessary, for example, for solid riveting or blind riveting can be omitted. However, in such self-piercing riveting processes, care has to be taken to ensure corresponding corrosion protection, since in particular when rivets differ from the components to be connected, a "contact corrosion" may occur which, in the long term, may result in the self-piercing riveted joint becoming detached and therefore failing.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a body structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
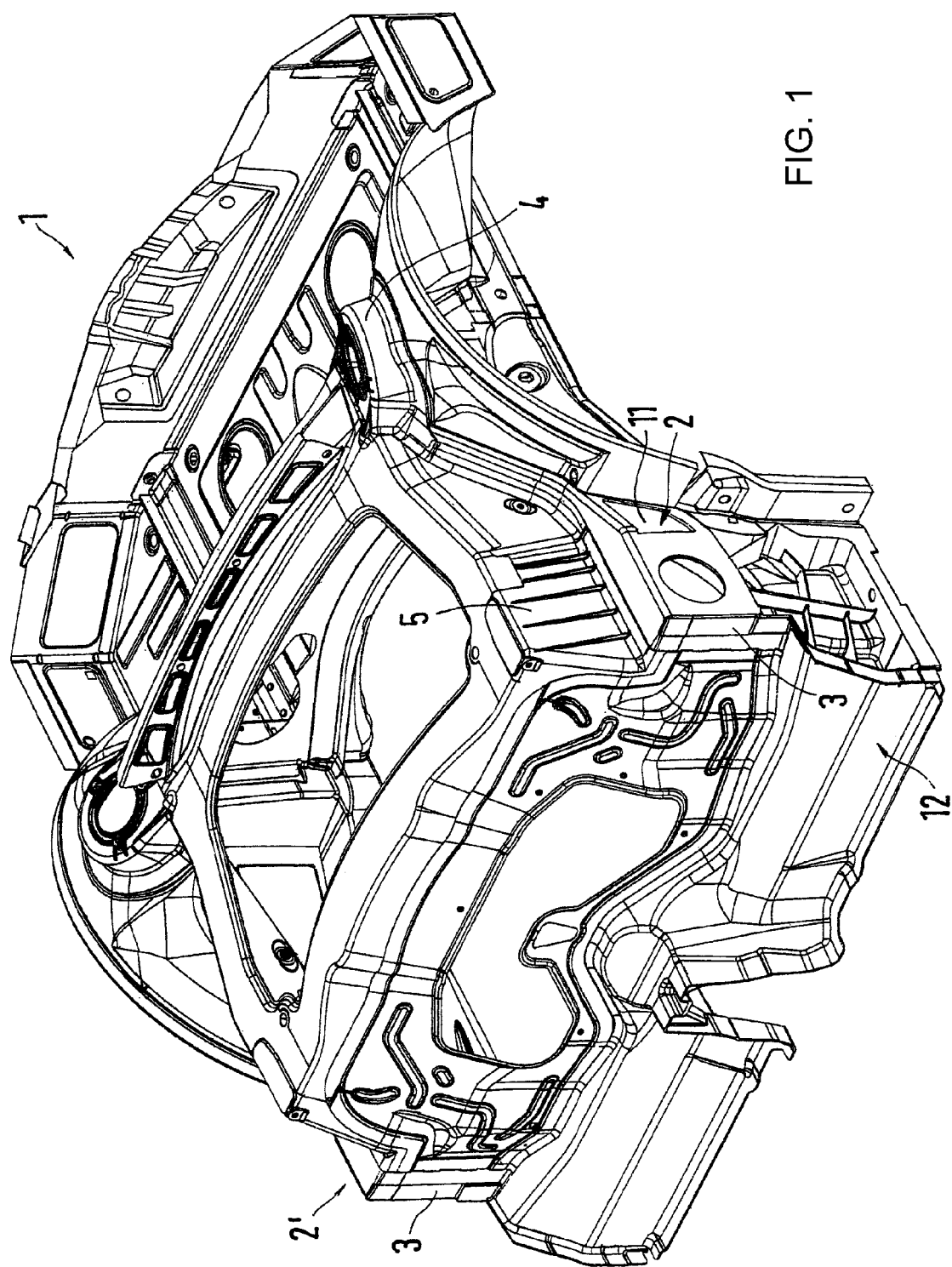
FIG. 1 is a diagrammatic, perspective view of a body structure according to the invention of a motor vehicle.
Figure 2:
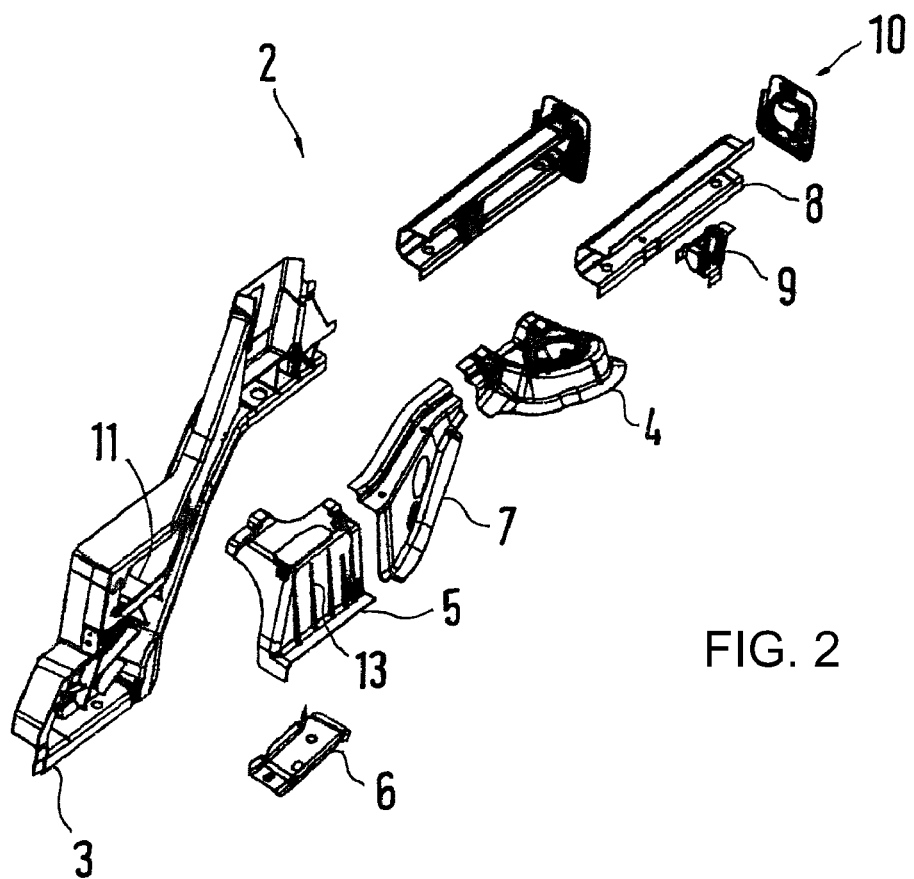
FIG. 2 is a diagrammatic, exploded, perspective view of a side wall according to the invention.
Figure 3:
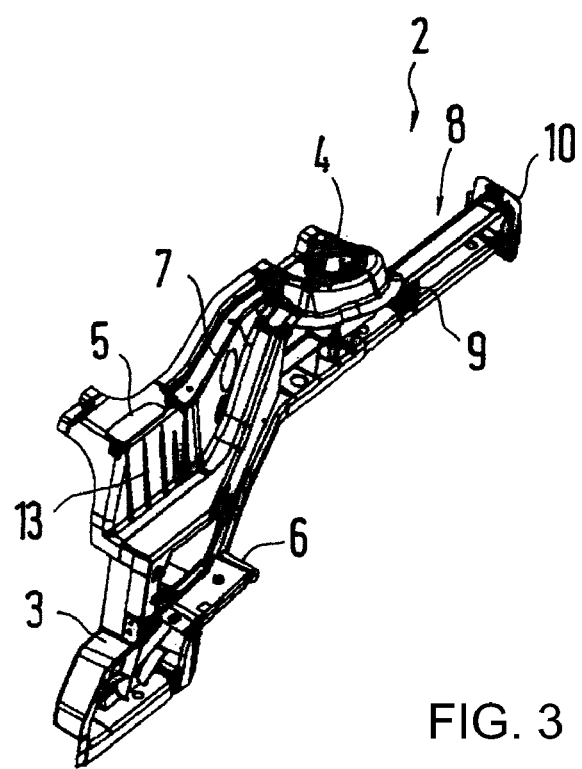
FIG. 3 is a perspective view of the side wall ready assembled from the components shown as per FIG. 2.

Referring now to the figures of the drawing in detail and first, particularly, to FIG. 1 thereof, there is shown a body structure 1 according to the invention of a rear end of a motor vehicle which has in each case two lateral side walls 2 and 2' which, according to the invention, are composed of at least three components. In this case, the at least three components of the side walls 2, 2' are a support 3, a suspension strut mount 4 and a bracket 5 for a rollover protection device (see FIG. 2). At least two of these components 3, 4, 5 are connected fixedly to one another by a corresponding connecting process, for example by a welded joint and/or a self-piercing riveted joint.

Furthermore, according to the invention, the at least three components 3, 4, 5 are configured as light metal diecast parts, in particular as diecast aluminum or magnesium parts. Light metal diecast parts have the decisive advantage of having high strength but only a low weight, which is of great advantage in particular in sports vehicle manufacturing. Furthermore, the support 3, the suspension strut mount 4 or the bracket 5 formed, for example, as a diecast aluminum part is extremely corrosion-resistant, since pure aluminum very rapidly forms an oxide layer in air, which prevents further corrosion of the aluminum arranged in a protected manner therebeneath. Of course, further add-on parts, such as, for example, a side wall edge plate 6, a frame edge plate 7 and an inner support 8, can be arranged on the side wall 2 (likewise see FIG. 2). Furthermore, a strut mount 9 and, above the inner support 8, an impact damper 10 can also be arranged on the side wall 2.

Of course, at least one passage opening 11 can also be provided in the side wall 2, 2', the passage opening 11 serving, for example, for sucking up air, for cooling or for the removal of a filter. The connection of a non-illustrated subframe or of a non-illustrated longitudinal link to the support 3 is also conceivable. On the ground side, the side wall 2, 2' is in each case connected fixedly, in particular welded, to a crossmember 12 which is preferably likewise configured as a light metal diecast part. In order to be able better to absorb the loads which occur in each case, stiffening profiles 13, for example in the manner of reinforcing ribs, can be provided on the individual components of the side wall 2, 2', in particular on the support 3 or on the bracket 5. The stiffening contours 13 can be produced in a single working step together with the particular component 3, 4 or 5 during the diecasting operation, with a position, orientation and/or strength of the respective stiffening contour 13 preferably being defined in advance by a relevant calculation program.

In general, with the side wall 2 assembled, according to the invention, from the individual components 3, 4, 5, which are configured as light metal diecast parts, a structural component which is optimized in terms of weight and rigidity can be provided, this finding a wide spectrum of use in particular in sports vehicle manufacturing which is optimized in terms of power and weight.

The invention claimed is:

1. A body structure of a motor vehicle, the body structure comprising:
   a rear side wall containing a support, a suspension strut mount and a bracket for a rollover protection device, said support, said suspension strut mount and said bracket all being metal diecast parts;
   said support, said suspension strut mount and said bracket being said diecast parts selected from the group consisting of diecast aluminum parts and diecast magnesium parts;
   said support, said suspension strut mount and said bracket connected fixedly to one another via at least one of a welded joint or a self-piercing riveted joint;
   said rear side wall having at least one passage opening formed therein for one of sucking up air, cooling or for a removal of a filter; and
   a cross-member configured as a light metal diecast part, said side wall fixedly connected, by welding, on a bottom side to said cross-member.

2. The body structure according to claim 1, further comprising at least one mount for one of a longitudinal link, diagonal struts, or a subframe, said mount disposed on said rear side wall.

3. The body structure according to claim 1, further comprising at least one further add-on part selected from the group consisting of a side wall edge plate, a frame edge plate and an inner support, said further add-on part disposed on said rear side wall.

4. The body structure according to claim 1, further comprising stiffening contours disposed on said support.

5. The body structure according to claim 4, wherein said stiffening contours are reinforcing ribs.

* * * * *